(12) United States Patent
Gallant et al.

(10) Patent No.: US 8,982,882 B2
(45) Date of Patent: Mar. 17, 2015

(54) METHOD AND SYSTEM FOR APPLICATION LEVEL LOAD BALANCING IN A PUBLISH/SUBSCRIBE MESSAGE ARCHITECTURE

(75) Inventors: John Kenneth Gallant, Sterling, VA (US); Karl M. Henderson, Dulles, VA (US); Brad Verd, Herndon, VA (US)

(73) Assignee: Verisign, Inc., Reston, VA (US)

( * ) Notice: Subject to any disclaimer, the term of this patent is extended or adjusted under 35 U.S.C. 154(b) by 499 days.

(21) Appl. No.: 12/615,205

(22) Filed: Nov. 9, 2009

(65) Prior Publication Data

US 2011/0110267 A1    May 12, 2011

(51) Int. Cl.
*H04L 12/28* (2006.01)
*H04L 12/58* (2006.01)
*H04L 29/08* (2006.01)

(52) U.S. Cl.
CPC ............ *H04L 12/5855* (2013.01); *H04L 51/14* (2013.01); *H04L 67/2814* (2013.01); *H04L 67/1031* (2013.01); *H04L 67/288* (2013.01)
USPC ............ 370/390; 370/310; 370/312; 370/351; 370/360; 370/389; 709/201; 709/203; 709/204; 709/206; 709/208; 709/217; 709/219; 709/223; 709/225; 709/227; 709/231

(58) Field of Classification Search
None
See application file for complete search history.

(56) References Cited

U.S. PATENT DOCUMENTS

| | | | |
|---|---|---|---|
| 6,202,093 B1 | 3/2001 | Bolam et al. | |
| 6,334,151 B1 | 12/2001 | Bolam et al. | |
| 6,336,119 B1 * | 1/2002 | Banavar et al. | 1/1 |
| 6,519,629 B2 | 2/2003 | Harvey et al. | |
| 6,578,066 B1 | 6/2003 | Logan et al. | |
| 7,133,869 B2 | 11/2006 | Bryan et al. | |
| 7,280,999 B2 | 10/2007 | Chung et al. | |
| 7,310,686 B2 | 12/2007 | Uysal | |
| 7,406,537 B2 * | 7/2008 | Cullen | 709/238 |

(Continued)

FOREIGN PATENT DOCUMENTS

WO     WO 2007/078283 A2     7/2007
WO     2011053847 A1     5/2011

OTHER PUBLICATIONS

International Search Report and Written Opinion of PCT Application No. PCT/US2010/049872, mailed Nov. 23, 2010, 9 pages total.

(Continued)

*Primary Examiner* — Faruk Hamza
*Assistant Examiner* — Aixa Guadalupe-Cruz
(74) *Attorney, Agent, or Firm* — MH2 Technology Law Group, LLP

(57) ABSTRACT

A method of publishing a message includes receiving a subscription request at a first remote relay from a first client and transmitting a subscription message from the remote relay to each of a first set of central relays. The method also includes receiving a publication request at a second remote relay from a second client and transmitting a publication message from the second remote relay to a first central relay of the first set of central relays and a second central relay of a second set of central relays. The method further includes determining, at the first central relay, that a target matches at least a portion of a pattern, transmitting the message string from the first central relay to the first remote relay, determining, at the first remote relay, that the target matches at least a portion of the pattern, and transmitting the message string to the first client.

12 Claims, 6 Drawing Sheets

(56) References Cited

U.S. PATENT DOCUMENTS

| | | | |
|---|---|---|---|
| 7,546,368 B2 | 6/2009 | Drees et al. |
| 7,631,101 B2 | 12/2009 | Sullivan et al. |
| 7,685,270 B1 | 3/2010 | Vermeulen et al. |
| 7,694,016 B2 | 4/2010 | Halley |
| 7,725,602 B2 | 5/2010 | Liu et al. |
| 7,734,815 B2 | 6/2010 | Leighton et al. |
| 7,761,570 B1 | 7/2010 | Halley |
| 7,769,826 B2 | 8/2010 | Gustafsson |
| 7,814,202 B2 | 10/2010 | Drees et al. |
| 7,925,747 B2 | 4/2011 | Kirwan et al. |
| 7,925,782 B2 | 4/2011 | Sivasubramanian et al. |
| 7,930,393 B1 | 4/2011 | Baumback et al. |
| 7,933,951 B2 | 4/2011 | Sullivan et al. |
| 2002/0129354 A1 | 9/2002 | Bryan et al. |
| 2003/0084057 A1 | 5/2003 | Balogh |
| 2003/0084074 A1 | 5/2003 | Balogh et al. |
| 2003/0084075 A1 | 5/2003 | Balogh et al. |
| 2003/0208539 A1 | 11/2003 | Gildenblat et al. |
| 2004/0039798 A1 | 2/2004 | Hotz et al. |
| 2004/0076155 A1 | 4/2004 | Yajnik et al. |
| 2004/0181588 A1 | 9/2004 | Wang et al. |
| 2004/0194102 A1 | 9/2004 | Neerdaels |
| 2004/0254926 A1 | 12/2004 | Balogh |
| 2005/0027882 A1 | 2/2005 | Sullivan et al. |
| 2005/0105513 A1 | 5/2005 | Sullivan et al. |
| 2005/0108257 A1 | 5/2005 | Ishii et al. |
| 2006/0031432 A1 | 2/2006 | Patrick et al. |
| 2006/0059253 A1 | 3/2006 | Goodman et al. |
| 2006/0085507 A1 | 4/2006 | Zhao et al. |
| 2006/0235885 A1 | 10/2006 | Steele et al. |
| 2007/0061282 A1 | 3/2007 | Ganguly et al. |
| 2007/0070820 A1 | 3/2007 | Gallant |
| 2007/0088711 A1 | 4/2007 | Craggs |
| 2007/0100808 A1 | 5/2007 | Balogh |
| 2007/0150596 A1 | 6/2007 | Miller et al. |
| 2007/0294419 A1 | 12/2007 | Ulevitch |
| 2008/0059152 A1 | 3/2008 | Fridman et al. |
| 2008/0071909 A1 | 3/2008 | Young et al. |
| 2008/0133646 A1 | 6/2008 | Azulai |
| 2008/0133729 A1 | 6/2008 | Fridman et al. |
| 2008/0155254 A1 | 6/2008 | Stradling |
| 2008/0201413 A1 | 8/2008 | Sullivan et al. |
| 2008/0256166 A1 | 10/2008 | Branson et al. |
| 2008/0256553 A1 | 10/2008 | Cullen |
| 2008/0260119 A1 | 10/2008 | Marathe et al. |
| 2008/0307436 A1 | 12/2008 | Hamilton |
| 2009/0044246 A1 | 2/2009 | Sheehan et al. |
| 2009/0063664 A1 | 3/2009 | Tiberio, Jr. |
| 2009/0106211 A1 | 4/2009 | Balogh |
| 2009/0106390 A1 | 4/2009 | Kirwan, Jr. et al. |
| 2009/0138572 A1 | 5/2009 | Banks et al. |
| 2009/0157889 A1 | 6/2009 | Treuhaft |
| 2009/0235359 A1 | 9/2009 | Abdulhayoglu et al. |
| 2009/0282027 A1 | 11/2009 | Subotin et al. |
| 2009/0282028 A1 | 11/2009 | Subotin et al. |
| 2009/0282038 A1 | 11/2009 | Subotin et al. |
| 2010/0030897 A1 | 2/2010 | Stradling |
| 2010/0077462 A1 | 3/2010 | Joffe et al. |
| 2010/0082748 A1 | 4/2010 | Banks et al. |
| 2010/0138559 A1 | 6/2010 | Sullivan et al. |
| 2010/0218040 A1 | 8/2010 | Bodmer et al. |
| 2010/0257266 A1 | 10/2010 | Holmes et al. |
| 2010/0274836 A1 | 10/2010 | Orentas et al. |
| 2010/0274970 A1 | 10/2010 | Treuhaft et al. |
| 2010/0287532 A1 | 11/2010 | Smith et al. |
| 2010/0291950 A1 | 11/2010 | Lin et al. |
| 2010/0318858 A1 | 12/2010 | Essawi et al. |
| 2010/0333111 A1* | 12/2010 | Kothamasu et al. .......... 719/313 |
| 2011/0022678 A1 | 1/2011 | Smith et al. |
| 2011/0029662 A1 | 2/2011 | Drees et al. |
| 2011/0035469 A1 | 2/2011 | Smith et al. |
| 2011/0035497 A1 | 2/2011 | Daly et al. |
| 2011/0047292 A1 | 2/2011 | Gould et al. |
| 2011/0051728 A1 | 3/2011 | Bhogavilli et al. |
| 2011/0099232 A1 | 4/2011 | Gupta et al. |
| 2011/0106891 A1 | 5/2011 | Gallant et al. |
| 2011/0110267 A1 | 5/2011 | Gallant |
| 2011/0161289 A1 | 6/2011 | Pei et al. |
| 2013/0024527 A1 | 1/2013 | Miller et al. |
| 2013/0024528 A1 | 1/2013 | Gallant et al. |
| 2013/0024529 A1 | 1/2013 | Gallant et al. |

OTHER PUBLICATIONS

Wikipedia entry on Publish/Subscribe, entry first appeared Dec. 28, 2007; retrieved from the Internet: <<http://en.wikipedia.org/wiki/Publish/subscribe>>, 3 pages total.

Supplementary European Search Report, dated May 6, 2013, European Application No. 10828717.8, filed Sep. 22, 2010, pp. 1-7, issued by the European Patent Office.

Non-Final Office Action dated Aug. 27, 2014, U.S. Appl. No. 13/534,634, filed Jun. 27, 2012, pp. 1-41.

Non-Final Office Action dated Aug. 27, 2014, U.S. Appl. No. 13/534,732, filed Jun. 27, 2012, pp. 1-38.

European Search Report dated Oct. 14, 2013 from European Patent Application No. 13173260.4 filed Jun. 21, 2013, pp. 1-4.

European Search Report dated Oct. 17, 2013 from European Patent Abpimation No. 13173251.3 filed Jun. 21, 2013, pp. 1-6.

International Search Report and Written Opinion, dated Dec. 23, 2010, for International Application No. PCT/US2010/054833, filed Oct. 29, 2010, 7 pages, published worldwide by the WIPO on their website.

Birman et al., "Exploiting virtual synchrony in distributed systems,"ACM SIGOPS Operating Systems Review, Nov. 1987; 21(5); 123-138.

Non-Final Office Action dated Apr. 24, 2014, issued in U.S. Appl. No. 13/534,786, filed Jun. 27, 2012, pp. 1-46.

Extended European Search Report dated Jan. 23, 2014 from European Application No. 13173166.7, 11 pages.

Non-Final Office Action dated Jan. 15, 2014, for U.S. Appl. No. 13/534,732, filed Jun. 27, 2012, pp. 1-50.

Non-Final Office Action dated Jan. 3, 2014, for U.S. Appl. No. 13/534,634, filed Jun. 27, 2012, pp. 1-46.

* cited by examiner

| Event | Remote Relay | Central Relay |
|---|---|---|
| Receive a Subscribe | - Record Subscription<br>- Subscribe to each central relay in one set of central relays | Record Subscription |
| Receive a Publish from a remote client | Forward Publish to one central relay in each set of central relays | |
| Receive a Publish from a remote relay | Forward Publish to one central relay in each set of central relays | Publish to remote relays that subscribed |
| Receive a Publish from a central relay | Publish to clients that subscribed | |

*FIG. 4*

METHOD AND SYSTEM FOR APPLICATION LEVEL LOAD BALANCING IN A PUBLISH/SUBSCRIBE MESSAGE ARCHITECTURE

BACKGROUND OF THE INVENTION

Publish and subscribe (publish/subscribe) systems are asynchronous messaging systems. Messages are categorized in classes and a subscriber expresses interest in one or more classes of messages to a server. The publisher of a message (publisher) does not send the message to a specific receiver (subscriber), but publishes the message to the server, without knowledge of what (if any) subscribers will receive the message. When a message is received for publication, the server transmits the message to subscribers who have expressed interest in the class associated with the message. Thus, the publishers and subscribers are decoupled in a publish and subscribe system, operating independently of each other.

The first publish and subscribe system was the "news" subsystem in the Isis Toolkit, which was described in a paper "Exploiting Virtual Synchrony in Distributed Systems" at the 1987 ACM Symposium on Operating Systems Principles conference (p. 123-138).

As each user subscribes to various classes of messages, subscribers typically receive only a sub-set of the total messages published. As an example, a subscriber may subscribe to messages based on the topic of the message. Subscribers in a topic-based system will receive all messages published to the topics to which they subscribe. All subscribers to a topic receive the same messages. As another example, a subscriber may subscribe to messages based on the content of the message. In a content-based system, a message is only delivered to a subscriber if the attributes or contents of the message matches constraints defined by the subscriber. Some publish and subscribe system combine topics and contents in a hybrid manner.

In a typical publish and subscribe system, a server receives subscription requests from clients wishing to receive messages based on topic or content. When a user wants to publish a message, the message is sent to the server, which then forwards the message to the various users who have submitted subscription requests matching the message properties. In this way, the server performs a filtering function, only transmitting the message to interested subscribers. Some servers may perform a store-and-forward function during the process of routing messages from publishers to subscribers, decoupling the publishers and subscribers temporally. An example of this temporal decoupling is temporarily taking down a publisher in order to allow the subscriber to work through the backlog, producing a form of bandwidth throttling.

For relatively small installations, publish/subscribe systems, through parallel operation, message caching, and the like, can provide better scalability than a traditional client-server system. However, as a publish/subscribe system is scaled up, benefits provided by the publish/subscribe system are often lost. Thus, despite the functionality provided by conventional publish/subscribe systems, there is a need in the art for improved publish/subscribe systems as well as methods for using such systems.

SUMMARY OF THE INVENTION

The present invention relates generally to computer networks. More specifically, the present invention relates to methods of operating a publish/subscribe system. Merely by way of example, the invention has been applied to a publish/subscribe system in which remote relays communicating with multiple sets of central relays receive a subscription request from a client and subscribe to all of the central relays in one set of central relays. Publication messages from clients are published to only one central relay in each set of central relays. Thus, embodiments of the present invention implement an architecture in which publication message load balancing is provided at the application level. The methods and techniques can be applied to a variety of computer networks and communications systems.

According to an embodiment of the present invention, a method of publishing a message is provided. The method includes receiving a subscription request at a first remote relay from a first client and transmitting a subscription message from the remote relay to each of a first set of central relays. The subscription request and the subscription message include a target. The method also includes receiving a publication request at a second remote relay from a second client and transmitting a publication message from the second remote relay to a first central relay of the first set of central relays and a second central relay of a second set of central relays. The publication request includes a message string characterized by a pattern and the publication message includes the message string. The method further includes determining, at the first central relay, that the target matches at least a portion of the pattern, transmitting the message string from the first central relay to the first remote relay, determining, at the first remote relay, that the target matches at least a portion of the pattern, and transmitting the message string to the first client.

According to another embodiment of the present invention, a publish/subscribe message architecture is provided. The publish/subscribe message architecture includes a first set of central relays, a second set of central relays, and a first remote relay in communication with the first set of central relays. The publish/subscribe message architecture also includes a first client in communication with the first remote relay. The first remote relay is operable to transmit a subscription request to each of the central relays in the first set of central relays. The publish/subscribe message architecture further includes a second remote relay in communication with the second set of central relays and a second client in communication with the second remote relay. The second remote relay is operable to transmit a publication message to one of the central relays in the first set of central relays and one of the central relays in the second set of central relays.

According to a specific embodiment of the present invention, a method of operating remote relays is provided. The method includes receiving, at a first remote relay, a subscription request from a first remote client and recording, in a computer readable medium of the first remote relay, identify information associated with the first remote client. The subscription request includes a target and information associated with the target is also recorded, in the computer readable medium of the first remote relay. The method also includes transmitting a subscription message to each of a first set of central relays. The subscription message includes the target. The method further includes receiving, at a second remote relay, a publication request from a second remote client and transmitting a publication message from the second remote relay to a first central relay of a first set of central relays and a second central relay of a second set of central relays. The publication request includes a message string characterized by a pattern and the publication message includes the message string. Moreover, the method includes receiving, at the first remote relay, the message string from the first central relay, determining, at the first remote relay, that the target matches at least a portion of the pattern, and transmitting the message string from the first remote relay to the first client.

Numerous benefits are achieved by way of the present invention over conventional techniques. For example, by utilizing the publish/subscribe architecture described herein, load balancing is provided at the application level. Utilizing a hierarchical structure, the number of connections from remote sites to central sites is greatly reduced. A reduction in the number of connections results in decreased system complexity in relation to configuring, maintaining, and running the IP network, enhanced security, and improved system performance. Additionally, embodiments of the present invention enhance system performance by reducing the number of duplicate publications.

Moreover, embodiments of the present invention enable system scalability by increasing the performance of the system as a whole in terms of messages per second that can be handled. As an example, if the traffic is being balanced across three application load balancing servers that are all performing about the same amount of work, each server is handling one third of the traffic for that site. Adding a fourth sever will increase the capacity since each server would then handle one fourth of the current traffic at the site. Due to the spare capacity on each server resulting from the addition of the fourth server, the overall capacity can be increased as the traffic rate increases. Embodiments of the present invention enable practically arbitrary increases in system scalability.

Furthermore, embodiments of the present invention provide systems that are characterized by both high availability and reliability. For example, when a client or server sends a message to a set of load balanced servers, it has the responsibility to send it to a server to which it has valid connection. Having more servers as elements of the system enables messages to still be transmitted through the system, even with more of the servers being in a failed state. For instance, if there are two servers in a set and both are in a failed state, the sender is not able to send the message using either server. However, if there are, for example, five servers in a set and two are in a failed state, three servers are still available to transmit the message through the system.

These and other embodiments of the invention along with many of its advantages and features are described in more detail in conjunction with the text below and attached figures.

BRIEF DESCRIPTION OF THE DRAWINGS

FIG. 4 is a chart illustrating message flow in a publish/subscribe system according to an embodiment of the present invention.

DETAILED DESCRIPTION OF SPECIFIC EMBODIMENTS

As discussed above, typical publish and subscribe systems are one-level implementations in which a server interacts with subscribers and publishers. Each subscriber submits subscription requests to the server and each publication request is also submitted to the server. A drawback of using a conventional one-level system is that each client (either publisher or subscriber) is connected to the server, which results in a large number of connections between the clients and the server. The large number of connections, in turns, results in complexity in configuring, maintaining, and running the network on account of firewall rules, configuration of multiple logical paths, and the like.

Embodiments of the present invention utilize a hierarchical structure that reduces the number of connections from clients to central sites, for example, by an order of magnitude. Reducing the number of connections reduces the complexity of the network and associated configuration and maintenance tasks. Additionally, reducing the number of connections between clients and central sites enhances security since fewer connections are established and the reduced number of connections can be more carefully tracked and controlled. Moreover, reducing the number of connections improves performance on both the servers and clients since the load on these systems associated with handling connection processing is reduced. The hierarchical publish and subscribe system with load balancing described herein provides benefits not available using conventional techniques including redundancy, security, and performance.

VeriSign's HMS (Hydra Messaging Service) system is a publish/subscribe implementation for message passing. This is also referred to as a message bus. The system provides the functionality of sending messages between edge sites (represented by remote clients) and central data centers including central relays, in order to transmit and receive monitoring data and monitoring commands. This includes statistics on the functioning of SDNS, Whois, TGV, CRL, and the like. These statistics are displayed in real time by the Java HUD and Argus HUD, which subscribe to HMS, and also used for historical reporting involving the Hydra database, Hydra Plots, and other users.

Embodiments of the present invention provide improvements in relation to the existing HMS system, introducing a hierarchical architecture with load balancing. In one implementation, there are two levels of hierarchy—remote relays and central relays. Typically, the central relays are located in data centers. However, the invention can be extended to an arbitrary number of levels of the hierarchy.

Figure 1:
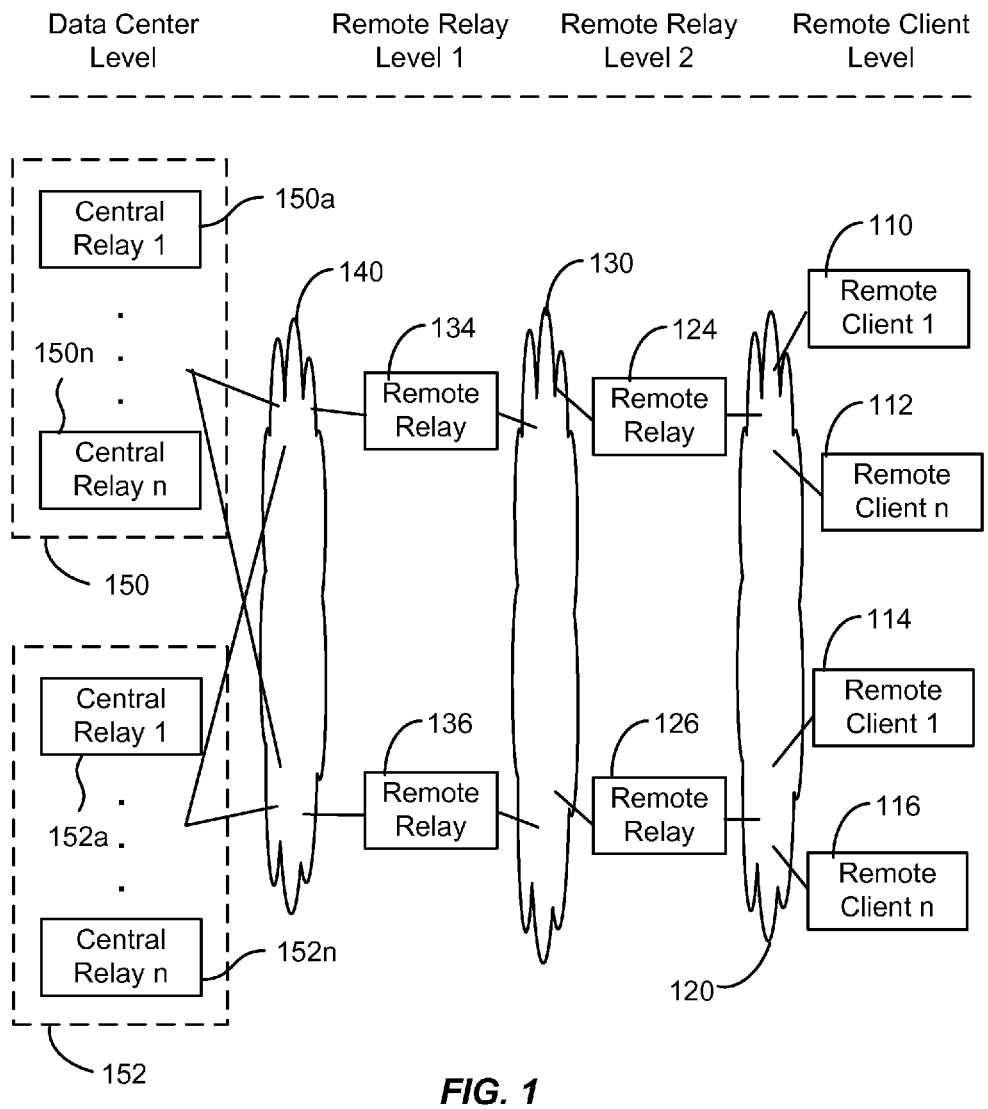
FIG. 1 is a simplified schematic diagram of a hierarchical publish/subscribe architecture according to an embodiment of the present invention.

FIG. 1 is a simplified schematic diagram of a hierarchical publish/subscribe architecture according to an embodiment of the present invention. Referring to FIG. 1, a number of remote clients 110 and 112 are connected through a network connection 120 to a remote relay 124. The network connection 120 can be one of several networks, including the Internet or other network suitable for communication between the remote clients 110/112 and the remote relay 124. The remote relay 124 is connected through network connection 130 to second remote relay 134. The remote relay 134 is connected through network connection 140 to one or more central relays (Central Relay 1 (150a) through Central Relay n (150n)) in a first data center 150. In addition to connection to the first data center 150, remote relay 134 is also connected through network connection 140 to second data center 152. Thus, embodiments of the present invention provide a hierarchical publish/subscribe system in which one or more remote relays may be utilized to provide for communications between remote clients and central relays. Additional description of hierarchical publish/subscribe systems is provided in co-pending and commonly assigned U.S. patent application Ser. No. 12/610,066, filed on Oct. 30, 2009, and entitled "Hierarchical publish and subscribe system," the disclosure of which is hereby incorporated by reference in its entirety.

FIG. 1 illustrates remote relays connected to remote clients in the Remote Client Level and central relays in the Data Center Level). Although three levels of hierarchy are illustrated in FIG. 1 (one level of central relays and two levels of remote relays (i.e., Remote Relay Level 1 and Remote Relay Level 2)), embodiments of the present invention are not limited to this particular number of hierarchical levels and other levels of hierarchy are included within the scope of the present invention. As an example, the number of levels of hierarchy could be two levels, four levels, or more levels as appropriate to the particular implementation. Additionally, although remote clients are only connected to the remote relays in Remote Relay Level 2, additional remote clients (not illustrated) can be connected through a network connection to remote relays in Remote Relay Level 1. Moreover, additional remote relays can be provided at Remote Relay Level 2 and additional remote relays can be provided at Remote Relay Level 1. One of ordinary skill in the art would recognize many variations, modifications, and alternatives.

The network connections 120, 130, and 140 are illustrated in FIG. 1 as separate networks, but this is not required by the present invention. The network connections can be provided as components of a single network, for example, the Internet, thereby providing for communications between the various remote clients, remote relays, and central relays.

A second data center 152 includes a number of central relays (Central Relay 1 (152a) through Central Relay n (152n)). The central relays in the second data center 152 are in communication with remote clients 114 and 116 through a hierarchical structure of remote relays 136 and 126 disposed in Remote Relay Level 1 and Remote Relay Level 2, respectively. As described more fully throughout the present specification, a subscription request originating at remote client 110 can be transmitted to the first data center 150 and the second data center 152 through remote relays 124 and 134/136. A publication request from remote client 114 can be transmitted to the first and second data centers through remote relays 126 and 134/136. Accordingly, if the message content published by remote client 114 matches the subscription request submitted by remote client 110, such content can be provided to remote client 110 using the publish/subscribe system described herein.

In order to provide load balancing for traffic through the data centers, subscription and publication messages are transmitted to predetermined central relays as described more fully throughout the present specification and more particularly below. For subscription requests, remote relays record the subscription request when received from a remote client and then forward the subscription request to each central relay in one of the data centers. The central relays receiving the subscription request will record the subscription request. The central relays in the other data center do not receive the subscription request. When a remote client transmits a publication request to a remote relay, the remote relay forwards the publication request to one of the central relays in each of the data centers. In an embodiment, the particular central relay in each of the data centers that receives the publication request is defined in configuration service data for the remote relay, enabling different remote relays to send their publication messages to different central relays.

After receiving the publication request, a central relay that has recorded the corresponding subscription request will then transmit the desired message to the remote relay from which the subscription request was received. In turn, the remote relay will transmit the desired message to the remote client that has submitted a subscription request.

Embodiments of the present invention utilizing the hierarchical architecture described herein are suitable for applications including systems that monitor network traffic, including DNS resolution systems (e.g., SDNS, TGV, Whois, and the like). The present invention is also suitable for use in other publish/subscribe systems, providing load balancing at the application level that will increase system performance and security. It should be noted that in contrast with conventional techniques that provide load balancing at the network level (e.g., packet load balancers), embodiments of the present invention provide load balancing at the application level.

Figure 2A:
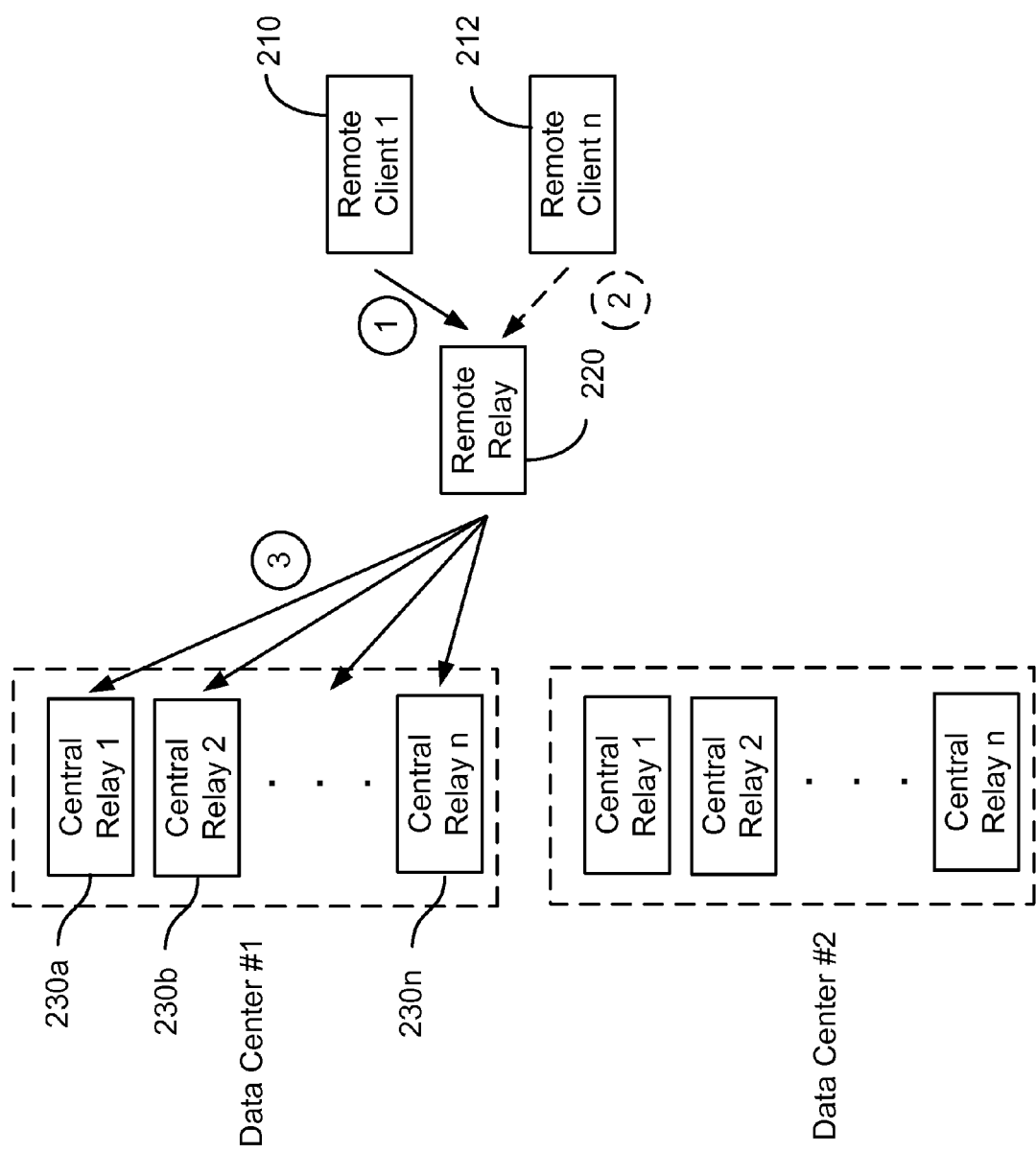
FIG. 2A is a simplified schematic diagram of a remote client and a remote relay transmitting a subscription request to multiple central relays according to an embodiment of the present invention.

FIG. 2A is a simplified schematic diagram of a remote client and a remote relay transmitting a subscription request to multiple central relays according to an embodiment of the present invention. Remote client 210 (one of n remote clients in communication with remote relay 220) transmits a subscription request to remote relay 220 (Process 1). The subscription request will include a target. As an example, remote client 210 may be interested in messages "starting with x." An optional subscription request originates from remote client 212 (Process 2). The optional subscription request can be for the same type of message or for a different type of message, for example, messages "starting with y." In an embodiment, if the subscription request is for the same type of message, then remote relay 220 will perform an aggregation or consolidation function, recording an indication that both remote client 210 and remote client 212 are interested in the particular message type. Since a subscription message will have already been sent out for these subscriptions that have already been requested by another remote client, the remote relay will perform a condensing function, just adding the identity of the newly subscribing remote client to a listing based on the original subscription request. Such a listing can be stored in a computer-readable memory of the remote relay.

As an example, a DNS service running on a server may track the number of DNS translations in a given time period. This DNS translation rate can be published as a statistic that other clients may be interested in receiving. This DNS translation statistic could begin with a predetermined character or string, for example, "DNST." Subscription requests for this DNS translation statistic will therefore, include a condition that a string in the publication message will satisfy. For this example, the condition would be strings that start with "DNST." This condition can also be referred to as a target and the string in the publication message can be referred to as a pattern. For this example, the pattern could be DNST100, indicating 100 DNS translations in a second. When a relay receives this pattern or string in a list of statistics being distributed to the system, the target DNST will be compared against the pattern DNST100, and patterns that start with the target DNST will satisfy the defined condition. Accordingly, the relay will deliver this statistic to the clients that have subscribed to these DNS translation statistics.

As another example, it may be desirable to send a command to a particular machine. In order to send this command, the machine could subscribe, providing it's machine name to the remote relay. Another machine can then send a publication message including the machine name of interest. During the publication process, the desired machine will receive the message based on the machine name of interest. Another variation on this command mode is that a publication message could be sent to all machines using a wildcard. One of ordinary skill in the art would recognize many variations, modifications, and alternatives.

Thus, the subscription message has a condition, also referred to as a target, and the published message is examined by the central relays and the remote relays to determine if the strings included in the published message have a pattern that satisfies the condition defined by the subscription message. As an example, the target could be a string of a first length (e.g., 4 characters) and the pattern could be a string of a second length (e.g., 10 characters) greater than the first length. The published messages are examined to determine if portions of the patterns in the message match the targets of interest. If there is a match between the target and a portion or all of the pattern, then the relay will direct the published message or some portion or variant thereof, to the other relays and clients that have subscribed using the target. The published message may be changed to another message as long as the clients that have subscribed using the target receive information related to their subscription.

Referring once again to FIG. 2A, after a new subscription request is received by remote relay 220, the remote relay records the subscription request so that the target in the subscription request can be compared against messages received by the remote relay at a later time. The remote relay 220 then forwards a subscription message to all of the central relays 230a-230n associated with Data Center #1 (Process 3). As mentioned above, if the subscription is not a new subscription to the remote relay, the condensing function will be performed and no additional subscription message will be sent to the central relays. As illustrated in FIG. 2A, two data centers, Data Center #1 and Data Center #2 are provided as part of the hierarchical publish/subscribe system. In other embodiments, additional data centers could be provided. The provision of multiple data centers provides for system redundancy and improved security and performance. The central relays 230a-230n illustrated in FIG. 2A can be co-located in a physical facility or geographically distributed as appropriate to the particular system implementation. In an embodiment, the central relays are co-located in a secure facility managed by the present assignee.

The subscription message is transmitted to all of the central relays in the first set of central relays (Data Center #1). In the illustrated example, there are three central relays illustrated, but fewer central relays or a greater number of central relays are included within the scope of the present invention. The subscription message is not sent to the central relays in the second set of central relays (Data Center #2). In an alternative embodiment, a variant of the subscription message including the target is transmitted to each of the central relays in the first set of central relays. Typically, the remote relays will store configuration data defining the set of central relays to which a particular remote relay will transmit subscription messages. As will be described more fully below, transmission of the subscription message to only one set of central relays will eliminate duplicate message delivery and provide for load balancing of publication messages. The central relays that receive the subscription message will record information related to the subscription message if it is a new subscription. If the subscription message is now new, then the central relay will perform a condensing function as discussed in relation to receipt of subscription messages by remote relays. As an example, if the target in the subscription message has already been processed by the central relay, then the identity of the remote relay will be added to the listing including the target and the identities of other remote relays that have already subscribed in relation to the target.

Although it is not required by the present invention, Central Relays 150a through 150n are co-located in a first data center 150 and Central Relays 152a through 152n are co-located in a second data center 152, with the dashed lines 150 and 152 representing a geographical boundary, that is, the geographical area associated with the data centers. It is also possible to have multiple levels of hierarchy without having multiple geographies. In the embodiment illustrated in FIG. 1, two levels of remote relays and a level of central relays, all at different geographical locations are illustrated, although this is merely an example and the present invention is not limited to this particular example. The present assignee maintains remote clients (also referred to as edge sites or remote sites) located in many countries throughout the world. Additionally, the present assignee maintains multiple data centers connected to these remote clients through one or more levels of remote relays. Therefore, although only two data centers are illustrated, the present invention is not limited to this particular implementation.

Figure 2B:
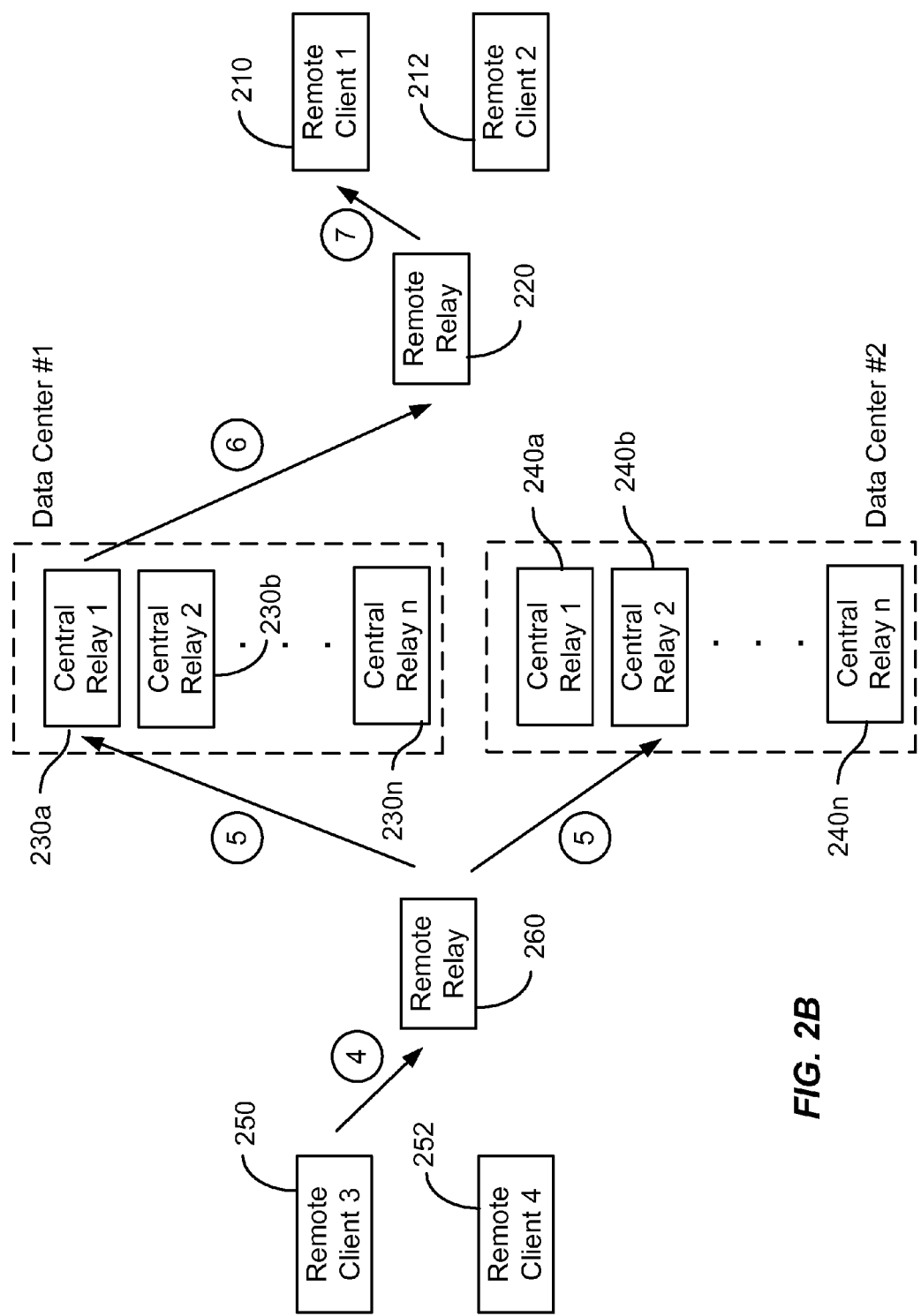
FIG. 2B is a simplified schematic diagram of a remote client and a remote relay implementing publication of a message to multiple central relays according to an embodiment of the present invention.

FIG. 2B is a simplified schematic diagram of a remote client and a remote relay implementing publication of a message to multiple central relays according to an embodiment of the present invention. Remote client 250 transmits a publication request to remote relay 260 (Process 4). The publication request may be a message including performance statistics or the like. Thus, the term request is used in a sense that does not require a reply. As discussed above, statistics related to the performance of the remote client 250 could be transmitted to remote relay 260 for distribution to interested clients. The publication request will include a message string characterized by a pattern. When the remote relay 260 receives the publication request, a publication message is transmitted from remote relay 260 to a first central relay of the first set of central relays (e.g., Central Relay 230a) and a second central relay of the second set of central relays (e.g., Central Relay 240b) (Process 5). The publication message, which may be the same as the publication request or a variant of the publication request, will include the message string. Thus, the publication message is transmitted to one central relay in the first set of central relays and one central relay in the second set of central relays. Therefore, embodiments of the present invention provide a hierarchical publish/subscribe system in which subscription messages are received by all of the central relays in one set of central relays (Process 3) and publication messages are received by one central relay in each set of central relays (Process 5).

Since the subscription message was received by all of the central relays in the first set (Data Center #1), the central relay that receives the publication message (Central Relay 230a) is able to determine a match between the pattern in the publication message and the target in the subscription message. As an example, if the target was "DNST" and the pattern was "DNST100," then central relay 230a would determine that the target matched a portion of the pattern, indicating that the central relay had received a subscription message from a remote relay interested in this type of message. Thus, a determination is made of whether the pattern satisfies a condition associated with the target.

Since the subscription message was not received at the second set of central relays (Data Center #2), the receipt of the publication message by Central Relay 240b does not result in a match between the target and at least a portion of the pattern. Embodiments of the present invention provide for application level load balancing since the publication message load is distributed between the various central relays in the data centers. Preferably, when subsequent publication messages are received at the data centers from other remote relays, the messages will be distributed, on average, approximately uniformly between the various central relays in the data centers. Thus, rather than having a single central relay perform most of the publication tasks, the workload is distributed between the various central relays. Although each central relay in a data center receives the subscription message and records the target, the publication message is only received by one central relay in the data center, resulting in only a single central relay processing the publication message to determine a match between the pattern and the target.

Once Central Relay 230a has determined a match, the message string is transmitted to remote relay 220 (Process 6), which is included in a list maintained by the central relay indicating an interest in this particular message type. In addition to the message string, additional information may be included along with the message string. Remote relay 220, in turn, determines that the target matches at least a portion of the pattern and transmits the message string to remote client 210 (Process 7). If remote client 212 had submitted a similar subscription request (Optional Process 2), then the message string would be transmitted to remote client 212 as well.

In implementations in which there is only one set of central relays, embodiments of the present invention will still provide for application level load balancing. In these implementations, subscription messages will be delivered to each central relay in the set, i.e., all the central relays in the system. The publication message will then be transmitted to and received by one of the central relays. The central relay receiving the publication message will then communicate the publication message to the subscribing remote relay(s). Therefore, even in implementations with a single set of central relays, the model of "subscribe to all and publish to one" will result in application level load balancing. It will be noted that in this single set implementation, the publication message will be sent to one central relay in the set of central relays rather than to one central relay in each of the multiple sets of central relays.

FIGS. 2A-2B illustrate remote clients that are able to both subscribe and publish. Typically, data (e.g., performance reporting, raw data packets that are sampled, authorization requests, and the like) constitutes the majority of traffic flowing from the remote clients to the data centers, while commands constitute the majority of the flow from the data centers to the remote clients. In other applications, the data and command flow may be varied. One of ordinary skill in the art would recognize many variations, modifications, and alternatives.

Figure 3:
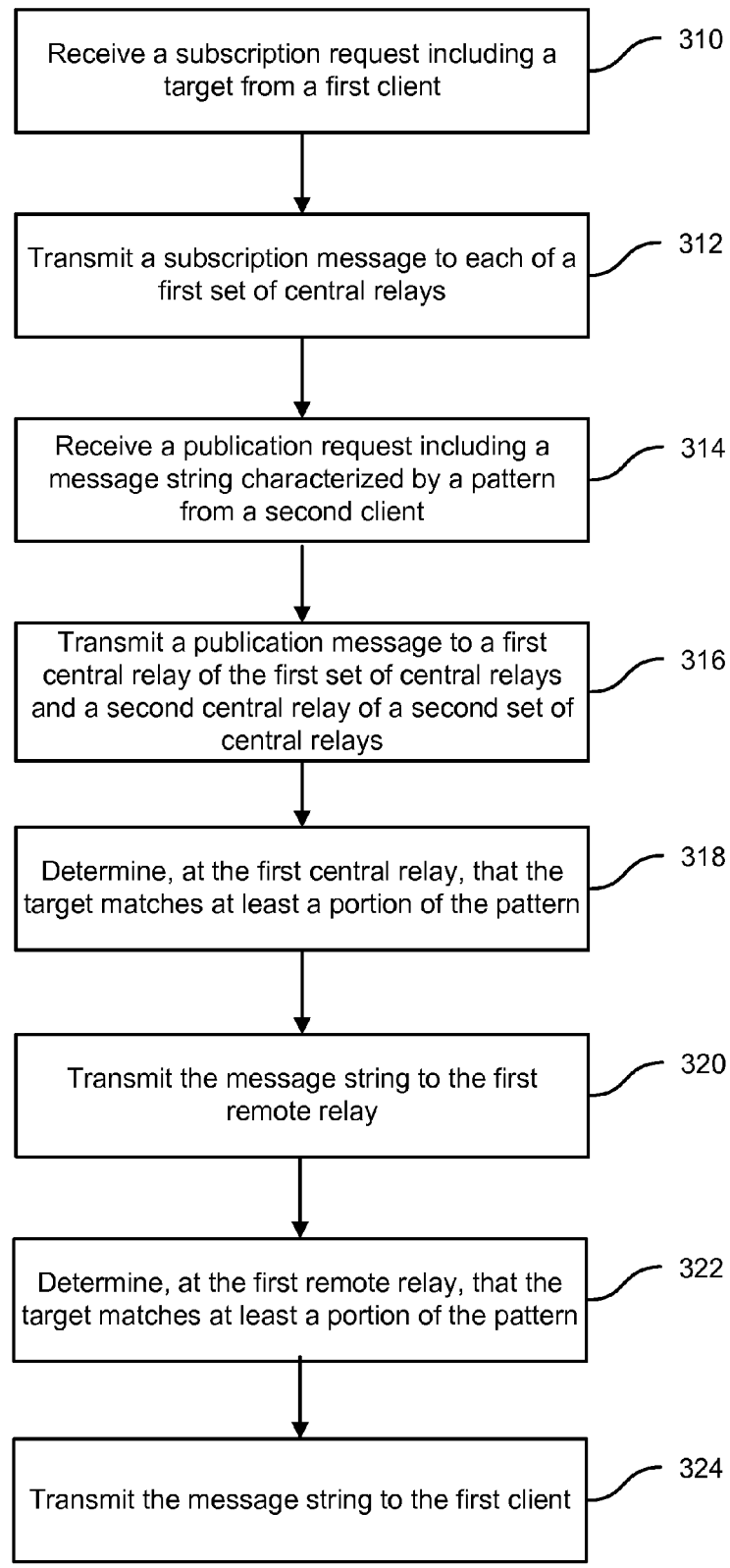
FIG. 3 is a simplified flowchart illustrating a method of implementing publication message load balancing in a publish/subscribe system according to an embodiment of the present invention.

FIG. 3 is a simplified flowchart illustrating a method of implementing publication message load balancing in a publish/subscribe system according to an embodiment of the present invention. The method includes receiving a subscription request at a first remote relay from a first remote client (310). The identity of the first remote client is recorded at the first remote relay along with a target. The target will be used to determine a match between a message string that is subsequently received by the first remote relay and the target. In other words, the remote relay stores an indication that the first remote client is interested in a particular type of publication message. The subscription message may be common to multiple remote clients, providing for aggregation of subscription requests and improvements in system efficiency.

A subscription message is transmitted from the first remote relay to each of a first set of central relays (312). The subscription message includes the target, providing the central relays with an indication that the first remote relay is interested in the particular type of publication message indicated by the first remote client. As illustrated in FIG. 2A, the subscription message is transmitted to all of the central relays in the first set of central relays. The subscription message is thus only transmitted to one of the sets of central relays in this illustrated embodiment. The particular set of central relays to which the subscription message is transmitted is defined in configuration files for the remote relay, defined during handshaking operations, assigned by a system operator, or the like. The central relays in the first set of central relays record information related to the subscription message, for example, the target and the identity of the first remote relay. The subscription message may pass through one or more remote relays before it reaches the central relays.

The publication portion of the publish/subscribe system is initiated when a publication request is transmitted from a second remote client to a second remote relay (314). The publication request includes a message string characterized by a pattern. The second remote relay is one of a number of remote relays that are in communication with the central relays illustrated in FIG. 2B. A publication message is transmitted from the second remote relay to a first central relay of the first set of central relays and a second central relay of a second set of central relays (316). The publication message includes the message string characterized by the pattern. The particular central relays to which the publication message is transmitted are defined in configuration files for the remote relay, defined during handshaking operations, assigned by a system operator, or the like. By transmitting the publication message to one central relay in each set, duplication of publication messages is eliminated. In some embodiments, the traffic load on the central relays is monitored and adaptive control of the remote relays is implemented in order to improve the load balancing performance of the system.

All of the central relays in the first set of central relays (including the first central relay) received the subscription message. However, none of the central relays in the second set of central relays (including the second central relay) received the subscription message. Thus, when the publication message is received by the first central relay, it is able to determine that the target matches at least a portion of the pattern (318). On the other hand, since the central relays in the second set of central relays did not receive the publication message, no match is found between the pattern and the targets stored in the central relays of the second set of central relays. Of course, if at some previous time, another remote relay had submitted a subscription message including the target to the second set of central relays, the second central relay would determine a match in a manner similar to the first central relay. However, in the method illustrated in FIG. 3, a simplified example is provided for purposes of clarity.

After determining a match, the first central relay transmits the message string to the first remote relay in response to determining that the first remote relay is interested in the message type associated with the publication message (320). Although in this particular example, the publication message is sent only to the first remote relay, one of skill in the art will appreciate that the publication message can be sent to multiple remote relays by the first central relay. For example, if the first central relay had received subscription messages with the same target from 15 of 90 remote relays, then when a publication message having a pattern partially or wholly matching the target is received, the first central relay would then transmit the publication message or a variant thereof to the 15 remote relays that had subscribed for this particular message type. One of ordinary skill in the art would recognize many variations, modifications, and alternatives.

At the first remote relay, a determination is made that the target matches at least a portion of the pattern (322). Based on the match, the first remote relay transmits the message string to the first client (324). Thus, the first client is able to receive the desired information in response to the initial subscription request.

It should be noted that although a single subscription request and a single publication request are used in the method illustrated in FIG. 3, the present invention is not limited to this particular implementation. Multiple subscription requests can be received, processed, and transmitted to the central relays by the remote relays. Multiple remote relays can be in communication with the central relays, transmitting subscription messages to one set of central relays. Thus, although only two remote relays are illustrated in FIG. 2A and FIG. 2B, a much greater number, for example, 80 or more remote relays, are in communication with the central relays in some implementations. The particular number of remote relays and the number of levels of hierarchy are dependent on the particular application. One of ordinary skill in the art would recognize many variations, modifications, and alternatives.

It should be appreciated that the specific steps illustrated in FIG. 3 provide a particular method of implementing publication message load balancing in a publish/subscribe system according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 is a chart illustrating message flow in a publish/subscribe system according to an embodiment of the present invention. The left hand column lists events. The middle column and the right column list actions taken by a remote relay or a central relay, respectively, in response to the event. Referring to the first row of the chart, if a subscription request/subscription message is received by a remote relay, it will record the subscription as long as the subscription is not a duplicate. If the subscription request is a duplicate request from a particular remote client, then the remote relay will discard this duplicate request. Additionally, if a similar subscription request has already been received from another source, the remote relay can update its database with the identity of the new requester so that the new requester will be associated with the target that is already stored. During the recording process, the identity of the requester, for example, a remote client or another remote relay, will be stored along with a target associated with the request. Typically, if the subscription request/message is new, then it will be transmitted by the remote relay after the recording process. Alternatively, multiple requests can be bundled by the remote relay before transmission in a batch mode of operation. After recording the subscription, if the remote relay is in a layer of the hierarchy below a remote relay (e.g., Remote Relay Level 2), the subscription message will be forwarded to a remote relay in a layer of the hierarchy closer to the central relays. If the remote relay is in a layer of the hierarchy adjacent to the central relays (e.g., Remote Relay Level 1), the remote relay will transmit a subscription message to each central relay in one set of central relays.

Continuing in the first row of the chart, if a subscription request is received by a central relay, the subscription will be recorded. Thus, when publication messages are received, the publication message, some portions thereof, or a variant thereof, can be transmitted to remote relays based on the information recorded by the central relay. Typically, the identity of the remote relay and the target are included in the subscription request.

The second row of the chart relates to receipt of a publication request from a remote client. The remote relay will forward a publication message related to the publication request to one central relay in each set of central relays. The publication message can be the publication request received from a remote client, a portion of the publication request, a variant of the publication request, or the like. As an example, the message string from the publication request could be forwarded to the central relays. The right column of the second row is blank because in one implementation, no remote clients are directly connected to central relays. In this implementation, all remote clients connect to central relays through a remote relay and publication requests are thus not received at a central relay from a remote client. In other implementations, remote clients can be directly connected to central relays without connection through a remote relay.

The third row of the chart relates to receipt of a publication message from a remote relay. If the publication message is received at a remote relay in the hierarchy adjacent to a central relay (i.e., from a remote relay at a lower level of the hierarchy), the publication message will be forwarded to one central relay in each set of central relays. This process is illustrated by Process 5 in FIG. 2B. If the publication message is received at a central relay, then the publication message will be transmitted to remote relays that have subscribed to the particular message type. As discussed in relation to FIG. 3, a determination will be made if at least a portion of the message string matches the target stored by the central relay.

The fourth row of the chart relates to receipt of a publication message from a central relay. When a remote relay adjacent to remote clients in the hierarchy receives such a publication message, it will transmit the publication message to remote clients that have subscribed to the particular message type. As discussed in relation to FIG. 3, a determination will be made if at least a portion of the message string matches the target stored by the remote relay. If the remote relay that receives the publication message is not adjacent to the remote clients in the hierarchy, it will forward the publication message to any remote relays in the next lower level of the hierarchy that have subscribed to the particular message type. In turn, the remote relays in the next lower level of the hierarchy will continue to forward the publication message until the message is delivered to the subscribing remote clients.

Figure 5:
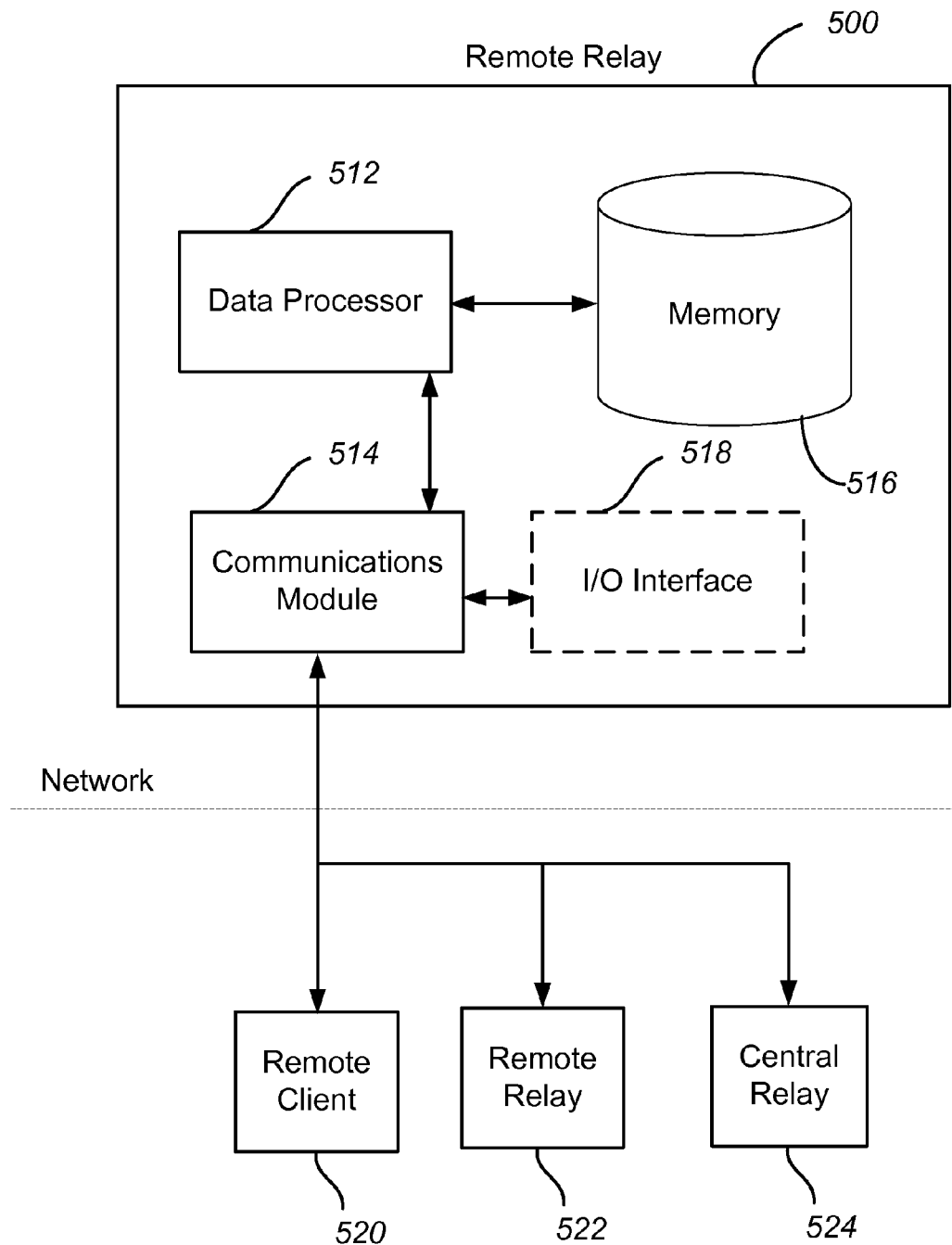
FIG. 5 is a simplified schematic diagram of elements of a remote relay according to an embodiment of the present invention.

FIG. 5 is a simplified schematic diagram of elements of a remote relay according to an embodiment of the present invention. The remote relay 500 includes a processor 512 (also referred to as a data processor), a communications module 514 and a memory 516. The processor 512 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 512 is coupled to the memory 516 in order to store and access stored information for use during operation of the hierarchical publish/subscribe system. The memory (also referred to as a database or a computer readable medium) 516 can be local or distributed as appropriate to the particular application. An example of memory is a hard drive, flash memory, or the like. An optional input/output interface 518 is provided to facilitate control of the remote relay by a system operator. The optional I/O interface 518 also provides a mechanism for delivering performance reports to a system operator, other suitable personnel, or suitable computer systems. More typically, the remote relay is controlled through the communication module 514, through which a system operator can interact with the remote relay.

The communications module 514 also provides for communication between the remote relay and remote clients 520, other remote relays 522, and/or central relays 524.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for processing a request at a first remote relay, the method comprising:
   receiving the request at the first remote relay from a first client, wherein the request comprises a subscription request or a publication request;
   determining, by the first remote relay, if the request is either the subscription request or the publication request;
   upon determining that the request is the subscription request, providing a subscription message from the first remote relay to each of a first set of central relays from among more than one set of central relays, wherein the subscription message comprises information related to the subscription request;
   upon determining that the request is the publication request, providing a publication message from the first remote relay to one central relay in each of the first set of central relays and a second set of central relays, wherein the publication message comprises information related to the publication request;
   determining, by the first remote relay, if a publication received from one of the central relays in either the first set of central relays or the second set of central relays is intended for the first client based on correspondence information from the publication with the information from the subscription request; and
   providing the publication to the first client if information from the publication corresponds to the information from the subscription request.

2. The method of claim 1 wherein the first set of central relays are located in a first data center and the second set of central relays are located in a second data center.

3. The method of claim 1 further comprising recording the subscription request at the first remote relay.

4. The method of claim 1 wherein providing the publication message from the first remote relay comprises:
   providing the publication message to a single central relay of the first set of central relays; and
   providing the publication message to a single central relay of the second set of central relays.

5. The method of claim 1 wherein the publication message is only provided to the first central relay and the second central relay.

6. The method of claim 1 wherein the information related to the subscription request comprises a target with a pattern including a predetermined character string.

7. The method of claim 6 wherein the pattern begins with the predetermined character string.

8. The method of claim 6 wherein the pattern ends with the predetermined character string.

9. A computer-implemented method of operating remote relays, the method comprising:
   receiving, at a first remote relay, a subscription request from a first remote client, wherein the subscription request includes a target;
   recording, in a computer readable medium of the first remote relay, identify information associated with the first remote client and information associated with the target;
   providing a subscription message to each of a first set of central relays, wherein the subscription message includes the target;
   receiving, at the first remote relay, a publication request from a second remote client, wherein the publication request includes a message string characterized by a pattern;
   providing a publication message from the first remote relay to a first central relay of a first set of central relays and a second central relay of a second set of central relays, wherein the publication message includes the message string;
   receiving, at the first remote relay, the message string from the first central relay;
   determining, at the first remote relay, that the target matches at least a portion of the pattern; and
   providing the message string from the first remote relay to the first client.

10. The method of claim 9 wherein the subscription message includes identity information associated with the first remote relay.

11. The method of claim 9 wherein the publication message is the message string.

12. The method of claim 9 wherein providing the publication message comprises providing the publication message to only the first central relay of the first set of central relays and the second central relay of the second set of central relays.

* * * * *